(12) United States Patent
Zhu

(10) Patent No.: US 12,231,391 B1
(45) Date of Patent: Feb. 18, 2025

(54) METHOD FOR CONSTRUCTING GEOSPATIAL GRID REGION NAME INTEROPERABILITY PROTOCOL SYSTEM

(71) Applicant: FUZHOU UNIVERSITY, Fuzhou (CN)

(72) Inventor: Daoye Zhu, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 0 days.

(21) Appl. No.: 18/788,290

(22) Filed: Jul. 30, 2024

(51) Int. Cl.
  *G06F 15/173* (2006.01)
  *H04L 61/4511* (2022.01)
  *H04L 69/329* (2022.01)

(52) U.S. Cl.
  CPC ........ *H04L 61/4511* (2022.05); *H04L 69/329* (2013.01)

(58) Field of Classification Search
  CPC .......................... H04L 61/4511; H04L 69/329
  USPC ......................................................... 709/224
  See application file for complete search history.

(56) References Cited

FOREIGN PATENT DOCUMENTS

| CN | 113267754 A | * | 8/2021 | ............... G01S 7/40 |
| CN | 115208853 A | | 10/2022 | |

\* cited by examiner

*Primary Examiner* — Alan S Chou
(74) *Attorney, Agent, or Firm* — Bayramoglu Law Offices LLC

(57) ABSTRACT

The provided is a method for constructing a geospatial grid region name interoperability protocol system. The method constructs the geospatial grid region name interoperability protocol system from four layers: a subdivision layer, a management layer, an association layer, and an application layer, specifically including a grid subdivision sub-protocol, a grid coding sub-protocol, a geospatial grid region name organization sub-protocol, a geospatial grid region name mapping sub-protocol, a geospatial grid region naming authorization sub-protocol, a geospatial grid region name-based code conversion sub-protocol, a geospatial grid region name interoperability sub-protocol, a geospatial grid region name registration sub-protocol, a geospatial grid region name resolution sub-protocol, etc., thereby achieving registration and resolution of a geospatial grid region name and mutual association and spatial interoperability of ubiquitous location information based on the geospatial grid region name.

4 Claims, 3 Drawing Sheets

METHOD FOR CONSTRUCTING GEOSPATIAL GRID REGION NAME INTEROPERABILITY PROTOCOL SYSTEM

CROSS-REFERENCE TO THE RELATED APPLICATIONS

This application is based upon and claims priority to Chinese Patent Application No. 202311245274.2, filed on Sep. 26, 2023, the entire contents of which are incorporated herein by reference.

TECHNICAL FIELD

The present invention relates to a method for constructing a geospatial grid region name interoperability protocol system.

BACKGROUND

Conventional methods in a geographical region name system are based on longitude and latitude location identification, which cannot achieve code-based data registration, resulting in disordered spatiotemporal data storage, low matching efficiency, and difficulty in interaction and sharing. GeoWeb and what3words construct a code, region name, and spatial information management and release system based on discrete global grids to solve problems in location identification and spatial information management and release, thereby providing a reference for the sharing and integration of "locations, objects, and information" in the context of big data, but they only solve part of the problems. Specifically, GeoWeb solves problems in region name conversion, but it is mainly aimed at professional spatial information and does not solve problems in ubiquitous location, object, and information conversion in the context of big data. In particular, it does not solve problems in unifying information IDs and location codes. what3 words only uses grid coding as a medium to solve problems in code conversion between abstract location semantics of longitude and latitude and near-natural languages, and involves neither ubiquitous location conversion nor data organization, management, and release in the context of big data conditions. what3words is only a location coding system, but ubiquitous location information interoperability needs to solve more than just location issues.

A so-called protocol refers to a series of steps or rules that two or more computer communication parties take and jointly follow in order to complete a specific task. This definition covers three levels of meaning, namely orderliness of the protocol process, joint participation in the protocol, and completeability of the protocol. The orderliness of the protocol process means that the protocol is an orderly process all along, and each step must be executed in sequence. If a previous step is not completed, subsequent steps of the protocol cannot be executed. Joint participation in the protocol means that the participants in the protocol consist of at least two parties, and if one party can complete a task by executing a step, the step does not constitute a protocol. The completeability of the protocol means that the execution of the protocol must be capable of completing a specified task, and if no task is completed, the no-op does not constitute a protocol. A protocol system is often divided into and defined by several layers to ensure that changes in a certain layer of protocols will not affect other layers of protocols.

SUMMARY

In view of the background, the present invention is intended to provide a method for constructing a geospatial grid region name interoperability protocol system which is divided into a subdivision layer protocol, an association layer protocol, a management layer protocol, and an application layer protocol.

To achieve the foregoing objective, a technical solution of the present invention is: a method for constructing a geospatial grid region name interoperability protocol system, where the geospatial grid region name interoperability protocol system is constructed from four layers: a subdivision layer, a management layer, an association layer, and an application layer, including a subdivision layer protocol, an association layer protocol, a management layer protocol, and an application layer protocol; the subdivision layer protocol, as a lowest-layer protocol in the geospatial grid region name interoperability protocol system, is configured for grid subdivision expression and grid coding of ubiquitous location information under a GeoSOT geospatial subdivision grid reference framework and a GeoSOT-3D three-dimensional geospatial subdivision grid reference framework; the management layer protocol is configured for organization of a large table of geospatial grid region name indexes, a mapping relationship between geospatial grid region names, and naming authorization of the geospatial grid region names; the association layer protocol, as a core protocol layer in the geospatial grid region name interoperability protocol system, is configured for interoperability of the ubiquitous location information, that is, providing interactive data access services; and the application layer protocol is configured for a user and provides the user with registration services and resolution services for the geospatial grid region names.

In an embodiment of the present invention, the subdivision layer protocol includes a grid subdivision sub-protocol and a grid coding sub-protocol, where the grid subdivision sub-protocol is a grid subdivision expression of a geospatial location, and the grid coding sub-protocol is as follows:

GeoSOT binary one-dimensional coding is configured for coding an area region name, GeoSOT-3D binary one-dimensional coding is configured for coding a personal region name, the GeoSOT-3D binary one-dimensional coding is a coding method that separately codes longitude, latitude, and altitude dimensions, and the GeoSOT binary one-dimensional coding does not require coding of the altitude dimension and codes the longitude and latitude dimensions in an identical manner as the GeoSOT-3D binary one-dimensional coding;

binary one-dimensional coding of the longitude and latitude dimensions is more efficient in calculating an inclusion relationship between codes; assuming that there is a ubiquitous location information positioning point P(x, y, z) in a geospace, where x, y, and z are longitude, latitude, and altitude coordinate values respectively of the ubiquitous location information positioning point P, conditions $x \in [-180°, 180°]$, $y \in [-90°, 90°]$, and $z \in [0, 50000000m]$ are met, and the ubiquitous location information positioning point P is subject to GeoSOT-3D binary three-dimensional coding at an n-th three-dimensional grid subdivision layer, and specific coding assignment formulas for GeoSOT-3D binary longitude, latitude, and altitude dimensions of the ubiquitous location information positioning point P are respectively as follows:

$\text{GeoSOT}_{3D}\_\text{Code}(x)_n =$ $$\begin{cases} \left\lfloor \dfrac{x+256}{2^{9-n}} \right\rfloor_{(2)}, & 0 \leq n \leq 9 \\ \text{GeoSOT}_{3D}\_\text{Code}(x)_9 \times \dfrac{64}{2^{15-n}} + \left\lfloor (x+256 - \text{GeoSOT}_{3D}\_\text{Code}(x)_9) \times \dfrac{60}{2^{15-n}} \right\rfloor_{(2)}, & 10 \leq n \leq 15 \\ \text{GeoSOT}_{3D}\_\text{Code}(x)_{15} \times \dfrac{64}{2^{21-n}} + \left\lfloor (x+256 - \text{GeoSOT}_{3D}\_\text{Code}(x)_{15}) \times \dfrac{60}{2^{21-n}} \right\rfloor_{(2)}, & 16 \leq n \leq 32 \end{cases}$$

the above formula is a coding formula for the GeoSOT-3D binary longitude dimension, where $\text{GeoSOT}_{3D}\_\text{Code}(x)_n$ means a three-dimensional grid longitude dimension code value corresponding to x at the n-th three-dimensional grid subdivision layer;

$\text{GeoSOT}_{3D}\_\text{Code}(y)_n =$ $$\begin{cases} \left\lfloor \dfrac{y+256}{2^{9-n}} \right\rfloor_{(2)}, & 0 \leq n \leq 9 \\ \text{GeoSOT}_{3D}\_\text{Code}(y)_9 \times \dfrac{64}{2^{15-n}} + \left\lfloor (y+256 - \text{GeoSOT}_{3D}\_\text{Code}(y)_9) \times \dfrac{60}{2^{15-n}} \right\rfloor_{(2)}, & 10 \leq n \leq 15 \\ \text{GeoSOT}_{3D}\_\text{Code}(y)_{15} \times \dfrac{64}{2^{21-n}} + \left\lfloor (y+256 - \text{GeoSOT}_{3D}\_\text{Code}(y)_{15}) \times \dfrac{60}{2^{21-n}} \right\rfloor_{(2)}, & 16 \leq n \leq 32 \end{cases}$$

the above formula is a coding formula for the GeoSOT-3D binary latitude dimension, where $\text{GeoSOT}_{3D}\_\text{Code}(y)_n$ means a three-dimensional grid latitude dimension code value corresponding to y at the n-th three-dimensional grid subdivision layer;

$$\text{GeoSOT}_{3D}\_\text{Code}(z)_n = z \times \left\lfloor \dfrac{2^n}{512 \times 111300} \right\rfloor_{(2)}, \quad 0 \leq n \leq 32$$

the above formula is a coding formula for the GeoSOT-3D binary altitude dimension, where $\text{GeoSOT}_{3D}\_\text{Code}(z)_n$ means a three-dimensional grid altitude dimension code value corresponding to z at the n-th three-dimensional grid subdivision layer;

where a GeoSOT-3D binary three-dimensional code $\text{GeoSOT}_{3D}\_\text{Code}(x, y, z)_n$ of the ubiquitous location information positioning point P(x, y, z) in the geospace is expressed as follows $(\text{GeoSOT}_{3D}\_\text{Code}(x)_n, \text{GeoSOT}_{3D}\_\text{Code}(y)_n, \text{GeoSOT}_{3D}\_\text{Code}(z)_n).$ A corresponding GeoSOT-3D binary one-dimensional code is expressed as follows:

$U_{i=0}^n \text{GeoSOT}_{3D}\_\text{Code}(x)_i \text{GeoSOT}_{3D}\_\text{Code}(y)_i \text{GeoSOT}_{3D}\_\text{Code}(z)_i, 0 \leq n \leq 32.$ In an embodiment of the present invention, the management layer protocol includes a geospatial grid region name organization sub-protocol, a geospatial grid region name mapping sub-protocol, and a geospatial grid region naming authorization sub-protocol, where the geospatial grid region name organization sub-protocol is a normalized protocol for ubiquitous location information organization for management of the large table of geospatial grid region name indexes;

a key in a database storing the geospatial grid region name indexes is a geospatial grid region name, and a value is ubiquitous location information metadata within a spatial location range represented by the geospatial grid region name, and parent and child storage paths thereof;

Num_of_Column( ) is defined as a function to obtain a number of columns in a specified value, and $n_1 = \text{Num\_of\_Column}(\text{Value\_1})$ and
$n_2 = \text{Num\_of\_Column}(\text{Value\_2});$ the geospatial grid region name mapping sub-protocol is as follows:

in accordance with the GeoSOT-3D binary three-dimensional code, a mapping relationship function between a GeoSOT-3D binary one-dimensional grid code and a region name identification expression is as follows:

$MF_i = f(\text{GeoSOT}_{3D}\_\text{Code}_i, \text{RegionName}_i), 0 \leq i \leq 32$ where $\text{GeoSOT}_{3D}\_\text{Code}_i$ is a GeoSOT-3D binary one-dimensional grid code at an i-th layer, $\text{RegionName}_i$ is a region name identification expression of the i-th layer, and the function f is the mapping relationship function between the GeoSOT-3D binary one-dimensional grid code and the region name identification expression;

in accordance with Z-order octree subdivision coding of a GeoSOT-3D geospatial subdivision grid, the following mapping relationship exists between a GeoSOT-3D grid code and a geospatial grid region name, that is, a mapping relationship between eight sub-grids of a next layer of grid subdivision is established;

$MF_{i+1}^{d\_lb} = f(\text{GeoSOT}_{3D}\_\text{Code}_{i+1}^{d\_lb}, \text{RegionName}_{i+1}^{d\_lb})$ $MF_{i+1}^{d\_rb} = f(\text{GeoSOT}_{3D}\_\text{Code}_{i+1}^{d\_rb}, \text{RegionName}_{i+1}^{d\_rb})$ $MF_{i+1}^{d\_lt} = f(\text{GeoSOT}_{3D}\_\text{Code}_{i+1}^{d\_lt}, \text{RegionName}_{i+1}^{d\_lt})$ $MF_{i+1}^{d\_rt} = f(\text{GeoSOT}_{3D}\_\text{Code}_{i+1}^{d\_rt}, \text{RegionName}_{i+1}^{d\_rt})$ where $MF_{i+1}^{d\_lb}$, $MF_{i+1}^{d\_rb}$, $MF_{i+1}^{d\_lt}$, and $MF_{i+1}^{d\_rt}$ respectively mean region name code mapping relationships of a grid with ascending longitude and latitude dimensions at a low altitude dimension;

$MF_{i+1}^{u\_lb} = f(\text{GeoSOT}_{3D}\_\text{Code}_{i+1}^{u\_lb}, \text{RegionName}_{i+1}^{u\_lb})$ $$MF_{i+1}{}^{u\_rb}=f(GeoSOT_{3D}\_Code_{i+1}{}^{u\_rb}, RegionName_{i+1}{}^{u\_rb})$$

$$MF_{i+1}{}^{u\_lt}=f(GeoSOT_{3D}\_Code_{i+1}{}^{u\_lt}, RegionName_{i+1}{}^{u\_lt}) \quad (5)$$

$$MF_{i+1}{}^{u\_rt}=f(GeoSOT_{3D}\_Code_{i+1}{}^{u\_rt}, RegionName_{i+1}{}^{u\_rt})$$

where $MF_{i+1}{}^{u\_lb}$, $MF_{i+1}{}^{u\_rb}$, $MF_{i+1}{}^{u\_lt}$, and $MF_{i+1}{}^{u\_rt}$ respectively mean region name code mapping relationships of a grid with ascending longitude and latitude dimensions at a high altitude dimension;

at a certain GeoSOT-3D grid subdivision layer, a mapping relationship between a three-dimensional grid code and a geospatial grid region name is expressed as follows:

$$(GeoSOT_{3D}\_Code, RegionName)_n$$

$$\rightarrow \left( \bigcup_{i=0}^{n} GeoSOT_{3D}\_Code(x)_i GeoSOT_{3D}\_Code(y)_i GeoSOT_{3D}\_Code(z)_i, RegionName_n \right), \quad 0 \leq n \leq 32$$

where x is the longitude coordinate value, y is the latitude coordinate value, z is the altitude coordinate value, n is the subdivision layer, and RegionName is a region name identification of a spatial region corresponding to the code under the subdivision layer n.

In an embodiment of the present invention, the association layer protocol includes a geospatial grid region name-based code conversion sub-protocol and a geospatial grid region name interoperability sub-protocol, where the geospatial grid region name-based code conversion sub-protocol configures a geospatial grid region name as middleware to achieve mutual conversion of grid codes in different industries; and a set of organization codes corresponding to different industry organizations is as follows:

$$OriCodeSet=\{OriCode_1, OriCode_2, OriCode_3, \ldots, OriCode_m\}$$

where $OriCode_m$ means an organization code corresponding to an m-th industry organization;
a set of personal code types corresponding to the set of organization codes is as follows:

$$OriCodeSet=\{P\_CodeType_1, P\_CodeType_2, P\_CodeType_3, \ldots, P\_CodeType_m\}$$

$P\_CodeType_m$ means a personal code type corresponding to an m-th organization code; within a personal space $SP\_RegionName_i$ corresponding to a certain personal region name $P\_RegionName_i$, there is a set of personal codes $P\_CodeSet_i=\{P\_Code_1{}^i, P\_Code_2{}^i, P\_Code_3{}^i, \ldots, P\_Code_m{}^i\}$ corresponding to the different industry organizations, where $P\_Code_m{}^i$ means a personal code corresponding to the m-th industry organization, and based on a spatial mapping relationship between the personal region name $P\_RegionName_i$ and $P\_CodeSet_i$, a conversion from an initial or input personal code to a target or output personal code is achieved;

where a region name-based code conversion is expressed as the following progressive relationship:

$$P\_Code_1{}^i \rightarrow SP\_RegionName_i$$

$$SP\_RegionName_i \rightarrow P\_RegionName_i$$

$$P\_RegionName_i \rightarrow P\_CodeSet_i$$

$$P\_CodeSet_i \rightarrow P\_Code_m{}^i$$

the geospatial grid region name interoperability sub-protocol supports interoperability between the different industry organizations or different departments of an identical industry organization within a grid corresponding to an identical geospatial grid region name, and is allowed for achieving exchange of heterogeneous data within the grid; and a mapping relationship between a geospatial grid region name, a grid code, and an organization code is as follows, where OriCode means an organization code corresponding to an industry organization;

$$R_{o,a,p \rightarrow c} \rightarrow <GridCode_1, OriCode>$$

$$R_{o,a,p \rightarrow c} \rightarrow <GridCode_2, OriCode>$$

$$R_{o,a,p \rightarrow c} \rightarrow <GridCode_3, OriCode>$$

$$R_{o,a,p \rightarrow c} \rightarrow <GridCode_n, OriCode>$$

o, a, p correspond to an organization segment, a region segment, and a personal segment, respectively; c is a characterized geospatial range; n is a number of grids at the N-th subdivision layer; $R_{o,a,p \rightarrow c}$ is a geospatial grid region name; and $GridCode_n$ is a grid code;

spatial interoperability between different organizations or different departments of an identical organization based on the geospatial grid region name GGRN is a spatial association operation, and the geospatial grid region name GGRN is a parameter of the spatial association operation.

In an embodiment of the present invention, the application layer protocol includes a geospatial grid region name registration sub-protocol and a geospatial grid region name resolution sub-protocol, where the geospatial grid region name registration sub-protocol enables the user to customize a geospatial grid region name and register the geospatial grid region name in a global geospatial grid region name registration and resolution service G2RS-GGRN through a local geospatial grid region name registration and resolution service L2RS-GGRN, and a specific geospatial grid region name registration process is as follows:

(1) the user enters an organization region name to which this registration belongs through a geospatial region name system platform, selects a personal region namespace, and enters ubiquitous location information; and the geospatial region name system platform automatically calculates an area region name from the personal region namespace based on a spatial location, and sends a geospatial grid region name registration request to a geospatial root region name server RootServ;

(2) the geospatial root region name server RootServ determines whether the user has registration permission and, if the user has the registration permission, transmits a registration authorization instruction to a code server CodeServ;

(3) the code server CodeServ transmits a generated personal code to a data server DataServ corresponding to an area region name at a 5th layer where the code server is located;

(4) the data server DataServ determines local uniqueness of a personal region name within the area region name at the 5th layer, and transmits a registration request with the local uniqueness to an area region name server AreaServ;

(5) a root server Root_AreaServ in the area region name server AreaServ finds a corresponding area sub-region name server $Sub\_AreaServ_j \in \{j|\alpha, \beta, \gamma, \delta, \ldots\}$ through an area region name at a 2nd layer, where $\alpha, \beta, \gamma, \delta, \ldots$ are area sub-region name servers, area region names from a 3rd layer to the 5th layer as well as personal region names and personal codes in an area region namespace at the 5th layer are registered in the area sub-region name server $Sub\_AreaServ_j$;

(6) a root server Root_OrgServ in an organization region name server OrgServ finds a corresponding organization sub-region name server $Sub\_OrgServ_i \in \{i|A, B, C, \ldots\}$ through an organization region name, where A, B, C, . . . are sub-region name servers for each region; an area region name is registered in the organization sub-region name server $Sub\_OrgServ_i$; and a registration application within the organization region name, namely an authorization instruction, is submitted to the geospatial root region name server RootServ;

(7) the geospatial root region name server RootServ authorizes the data server DataServ to store the personal region name and corresponding ubiquitous location information of the personal region name in the large table of geospatial grid region name indexes; and (8) the organization region name server OrgServ sends to the user a geospatial grid region name registration result: 0 (failure) or 1 (success);

the geospatial grid region name resolution sub-protocol comprises two types of resolution: vertical resolution of an organization region name and vertical resolution of an area region name, and a resolution process resolves a personal region name to the corresponding ubiquitous location information of the personal region name as follows:

I. Vertical Resolution of an Organization Region Name vertical recursive resolution of an organization region name is a process that first classifies the organization region name and performs resolution within an organization region namespace as follows:

(1) the user sends a request for geospatial grid region name resolution of <personal segment.area segment.organization segment.root segment> to the geospatial root region name server RootServ through the geospatial region name system platform;

(2) the geospatial root region name server RootServ resolves an organization region name and an area region name, and finds the organization region name server OrgServ through the resolved organization region name;

(3) the root server Root_OrgServ in the organization region name server OrgServ finds a corresponding organization sub-region name server $Sub\_OrgServ_i \in \{i|A, B, C, \ldots\}$ through the organization region name; the organization sub-region name server $Sub\_OrgServ_i$ transmits the request to the area region name server AreaServ corresponding to the organization region name;

(4) the root server Root_AreaServ in the area region name server AreaServ, based on an area region name at the 2nd layer, finds a corresponding area sub-region name server $Sub\_AreaServ_j \in \{j|\alpha, \beta, \gamma, \delta, \ldots\}$ through area region name resolution; and the area sub-region name server $Sub\_AreaServ_j$, based on an area region name at the 5th layer, transmits the request down to the data server DataServ corresponding to the area region name and the organization region name;

(5) after obtaining authorization, the data server DataServ reads ubiquitous location information in the large table of geospatial grid region name indexes stored by the data server based on the personal region name, and transmits the read ubiquitous location information to the user through the geospatial region name system platform;

II. Vertical Resolution of an Area Region Name vertical recursive resolution of an area region name is a process that first classifies the area region name and performs resolution within the area region namespace as follows:

(1) the user sends a request for geospatial grid region name resolution of <personal segment.area segment.organization segment.root segment> to the geospatial root region name server RootServ through the geospatial region name system platform;

(2) the geospatial root region name server RootServ resolves an area region name and an organization region name, and finds the area region name server AreaServ through the resolved area region name;

(3) the root server Root_AreaServ in the area region name server AreaServ, based on an area region name at the 2nd layer, finds a corresponding area sub-region name server $Sub\_AreaServ_j \in \{j|\alpha, \beta, \gamma, \delta, \ldots\}$ through area region name resolution; and the area sub-region name server $Sub\_AreaServ_j$ transmits the request to an organization region name OrgServ corresponding to the area region name;

(4) the root server Root_OrgServ in the organization region name server OrgServ finds a corresponding organization sub-region name server $Sub\_OrgServ_i \in \{i|A, B, C, \ldots\}$ through the organization region name; and the organization sub-region name server $Sub\_OrgServ_i$, based on an area region name at the 5th layer, transmits the request down to the data server DataServ corresponding to the area region name and the organization region name; and (5) after obtaining authorization, the data server DataServ reads ubiquitous location information in the large table of geospatial grid region name indexes stored by the data server based on the personal region name, and transmits the read ubiquitous location information to the user through the geospatial region name system platform.

Compared with the prior art, the present invention has the following beneficial effects: the present invention constructs the corresponding protocol system from the subdivision layer, the management layer, the association layer, and the application layer, thereby achieving registration and resolution of a geospatial grid region name and mutual association and spatial interoperability of ubiquitous location information based on the geospatial grid region name. The registration and resolution of a geospatial grid region name is a public service, in which the region name registration service is mainly for individual users who apply to register a geospatial grid region name, while the resolution service is mainly for individual users and organizations, for example, when a courier services company sends a geospatial grid region name, the corresponding address, three-segment code/four-segment code, and other information will be returned.

DETAILED DESCRIPTION OF THE EMBODIMENTS

Figure 1:
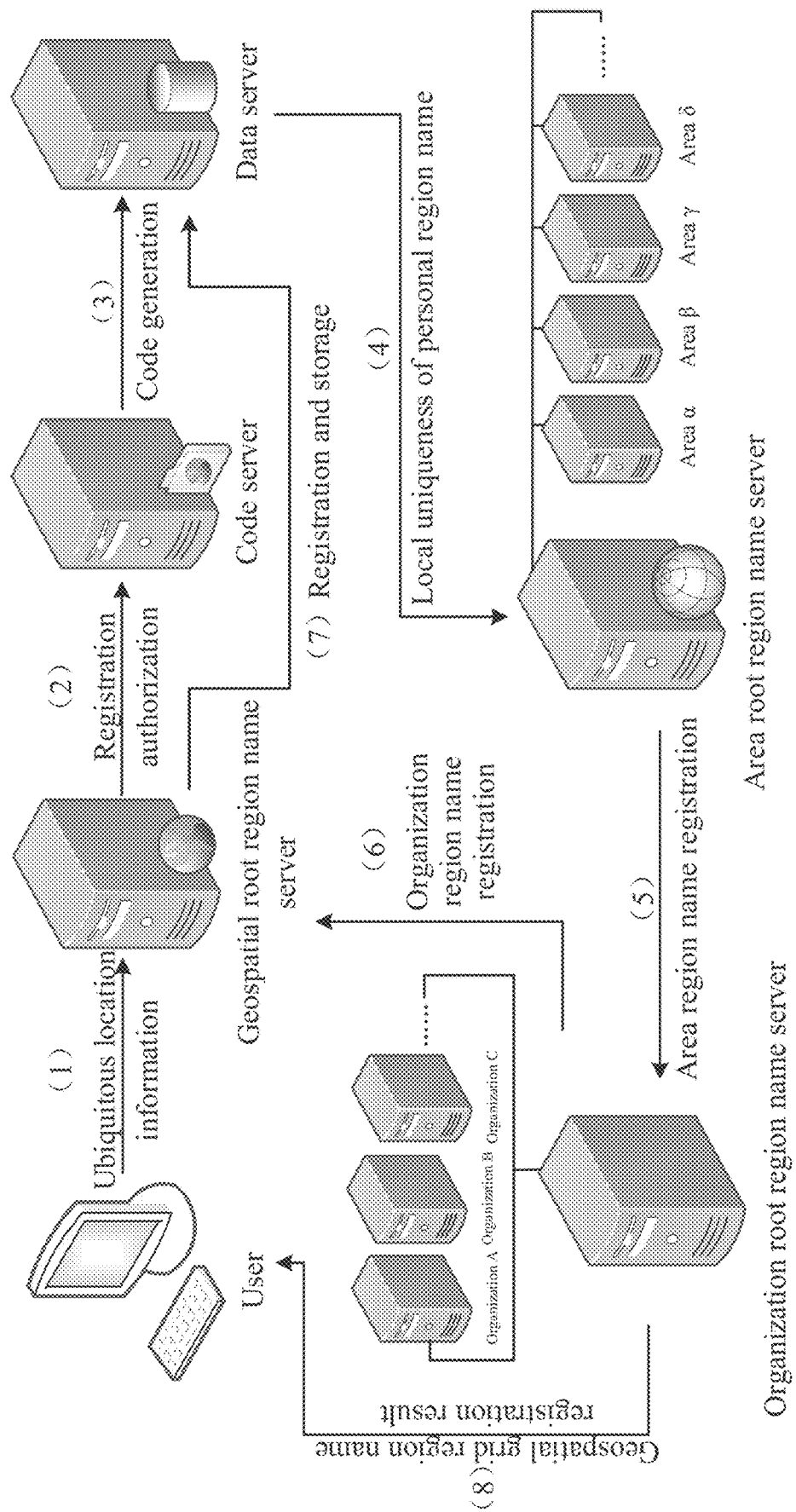
FIG. 1 is a schematic diagram of registration of a geospatial grid region name in accordance with the present invention.

The technical solution of the present invention is described below in detail with reference to the accompanying drawings.

The present invention provides a method for constructing a geospatial grid region name interoperability protocol system, where the geospatial grid region name interoperability protocol system is constructed from four layers: a subdivision layer, a management layer, an association layer, and an application layer, including a subdivision layer protocol, an association layer protocol, a management layer protocol, and an application layer protocol; the subdivision layer protocol, as a lowest-layer protocol in the geospatial grid region name interoperability protocol system, is configured for grid subdivision expression and grid coding of ubiquitous location information under a GeoSOT geospatial subdivision grid reference framework and a GeoSOT-3D three-dimensional geospatial subdivision grid reference framework; the management layer protocol is configured for organization of a large table of geospatial grid region name indexes, a mapping relationship between geospatial grid region names, and naming authorization of the geospatial grid region names; the association layer protocol, as a core protocol layer in the geospatial grid region name interoperability protocol system, is configured for interoperability of the ubiquitous location information, that is, providing interactive data access services; and the application layer protocol is configured for a user and provides the user with registration services and resolution services for the geospatial grid region names.

1. Subdivision Layer Protocol

The subdivision layer protocol, as a lowest-layer protocol in the geospatial grid region name interoperability protocol system, is configured mainly for grid subdivision expression and grid coding of ubiquitous location information under a GeoSOT geospatial subdivision grid reference framework and a GeoSOT-3D three-dimensional geospatial subdivision grid reference framework. For ubiquitous location information space management, the subdivision layer protocol includes a grid subdivision sub-protocol and a grid coding sub-protocol.

1.1 Grid Subdivision Sub-Protocol

The grid subdivision sub-protocol is a grid subdivision expression of a geospatial location.

1.2 Grid Coding Sub-Protocol

GeoSOT binary one-dimensional coding is configured for coding an area region name and GeoSOT-3D binary one-dimensional coding is configured for coding a personal region name herein. The GeoSOT-3D binary one-dimensional coding is a coding method that separately codes longitude, latitude, and altitude dimensions, while the GeoSOT binary one-dimensional coding does not require coding of the altitude dimension and codes the longitude and latitude dimensions in an identical manner as the GeoSOT-3D binary one-dimensional coding, which is not elaborated herein.

Binary one-dimensional coding of the longitude and latitude dimensions is more efficient in calculating an inclusion relationship between codes. Assuming that there is a ubiquitous location information positioning point $P(x, y, z)$ in a geospace, where x, y, and z are longitude, latitude, and altitude coordinate values respectively of the ubiquitous location information positioning point P, conditions $x \in [-180°, 180°]$, $y \in [-90°, 90°]$, and $z \in [0, 50000000m]$ are met, and the ubiquitous location information positioning point P is subject to GeoSOT-3D binary three-dimensional coding at an n-th three-dimensional grid subdivision layer, and specific coding assignment formulas for GeoSOT-3D binary longitude, latitude, and altitude dimensions of the ubiquitous location information positioning point P are respectively as follows.

The coding formula for the GeoSOT-3D binary longitude dimension is as follows, where $\text{GeoSOT}_{3D}\_\text{Code}(x)_n$ means a three-dimensional grid longitude dimension code value corresponding to x at the n-th three-dimensional grid subdivision layer. For example, $\text{GeoSOT}_{3D}\_\text{Code}(x)_9$ means the three-dimensional grid longitude dimension code value corresponding to x at the 9-th three-dimensional grid subdivision layer.

$$\text{GeoSOT}_{3D}\_\text{Code}(x)_n = \begin{cases} \left\lfloor \dfrac{x+256}{2^{9-n}} \right\rfloor_{(2)}, & 0 \le n \le 9 \\ \text{GeoSOT}_{3D}\_\text{Code}(x)_9 \times \dfrac{64}{2^{15-n}} + \left\lfloor (x+256-\text{GeoSOT}_{3D}\_\text{Code}(x)_9) \times \dfrac{60}{2^{15-n}} \right\rfloor_{(2)}, & 10 \le n \le 15 \\ \text{GeoSOT}_{3D}\_\text{Code}(x)_{15} \times \dfrac{64}{2^{21-n}} + \left\lfloor (x+256-\text{GeoSOT}_{3D}\_\text{Code}(x)_{15}) \times \dfrac{60}{2^{21-n}} \right\rfloor_{(2)}, & 16 \le n \le 32 \end{cases}$$

The specific implementation process of the present invention is as follows.

The present invention provides a method for constructing a geospatial grid region name interoperability protocol system which is divided into a subdivision layer protocol, an association layer protocol, a management layer protocol, and an application layer protocol.

The coding formula for the GeoSOT-3D binary latitude dimension is as follows, where $\text{GeoSOT}_{3D}\_\text{Code}(y)_n$ means a three-dimensional grid latitude dimension code value corresponding to y at the n-th three-dimensional grid subdivision layer. For example, $\text{GeoSOT}_{3D}\_\text{Code}(y)_9$ means the three-dimensional grid latitude dimension code value corresponding to y at the 9-th subdivision layer;

$$\text{GeoSOT}_{3D}\_\text{Code}(y)_n =$$

$$\begin{cases} \left\lfloor \dfrac{y+256}{2^{9-n}} \right\rfloor_{(2)}, & 0 \leq n \leq 9 \\ \text{GeoSOT}_{3D}\_\text{Code}(y)_9 \times \dfrac{64}{2^{15-n}} + \left\lfloor (y+256 - \text{GeoSOT}_{3D}\_\text{Code}(y)_9) \times \dfrac{60}{2^{15-n}} \right\rfloor_{(2)}, & 10 \leq n \leq 15 \\ \text{GeoSOT}_{3D}\_\text{Code}(y)_{15} \times \dfrac{64}{2^{21-n}} + \left\lfloor (y+256 - \text{GeoSOT}_{3D}\_\text{Code}(y)_{15}) \times \dfrac{60}{2^{21-n}} \right\rfloor_{(2)}, & 16 \leq n \leq 32 \end{cases}$$

The coding formula for the GeoSOT-3D binary altitude dimension is as follows, where $\text{GeoSOT}_{3D}\_\text{Code}(z)_n$ means a three-dimensional grid altitude dimension code value corresponding to z at the n-th subdivision layer.

$$\text{GeoSOT}_{3D}\_\text{Code}(z)_n = z \times \left\lfloor \dfrac{2^n}{512 \times 111300} \right\rfloor_{(2)}, \quad 0 \leq n \leq 32$$

where a GeoSOT-3D binary three-dimensional code $\text{GeoSOT}_{3D}\_\text{Code}(x, y, z)_n$ of the ubiquitous location information positioning point P(x, y, z) in the geospace is expressed as follows $(\text{GeoSOT}_{3D}\_\text{Code}(x)_n, \text{GeoSOT}_{3D}\_\text{Code}(y)_n, \text{GeoSOT}_{3D}\_\text{Code}(z)_n)$.

A corresponding GeoSOT-3D binary one-dimensional code is expressed as follows:

$$\left( \bigcup_{i=0}^{n} \text{GeoSOT}_{3D}\_\text{Code}(x)_i \text{GeoSOT}_{3D}\_\text{Code}(y)_i \text{GeoSOT}_{3D}\_\text{Code}(z)_i, \text{RegionName}_n \right),$$

$0 \leq n \leq 32$

2. Management Layer Protocol

The management layer protocol is configured mainly for organization of a large table of geospatial grid region name indexes, a mapping relationship between geospatial grid region names, and naming authorization of the geospatial grid region names. It is a base protocol in the geospatial grid region name interoperability protocol system and stipulates the organizational structure for geospatial grid region name management.

2.1 Geospatial Grid Region Name Organization Sub-Protocol

The geospatial grid region name organization sub-protocol is a normalized protocol for ubiquitous location information organization for management of the large table of geospatial grid region name indexes.

A key in a database storing the geospatial grid region name indexes is a geospatial grid region name, and a value is ubiquitous location information metadata within a spatial location range represented by the geospatial grid region name, and parent and child storage paths thereof. The ubiquitous location information metadata includes a country code, a courier services company code, an item attribute code, etc. in a universal postal address code.

Num_of_Column( ) is defined as a function to obtain a number of columns in a specified value, and $n_1$=Num_of_Column(Value_1) and $n_2$=Num_of_Column (Value_2). Table 1 shows the grid organization protocol specifications for the large table of geospatial grid region name indexes.

TABLE 1

Grid Organization Protocol Specifications for the Large Table of Geospatial Grid Region Name Indexes

| Key | Value_1 | Value_2 | Value_3 | |
|---|---|---|---|---|
| $\text{QPK}_{GGRN}$ | $\bigcup\limits_{i=0}^{n_1} \text{GeoSOT}\_\text{Code}_i^{GGRN}$ | $\bigcup\limits_{j=0}^{n_2} \text{attribute}_j^{meta}$ | $\text{path}_{par}$ | $\text{path}_{sub}$ |
| Primary index key of the geospatial grid region name | Geospatial grid code mapped by the geospatial grid region name information | Ubiquitous location information metadata information | Parent storage path of ubiquitous location | Child storage path of ubiquitous location |

2.2 Geospatial Grid Region Name Mapping Sub-Protocol

The GeoSOT-3D geospatial grid region name mapping is described below. Since GeoSOT does not need altitude dimension mapping, it will not be elaborated herein. In accordance with the GeoSOT-3D binary three-dimensional code, a mapping relationship function between a GeoSOT-3D binary one-dimensional grid code and a region name identification expression is as follows:

$$MF_i = f(\text{GeoSOT}_{3D}\_Code_i, RegionName_i), 0 \leq i \leq 32$$

In accordance with Z-order octree subdivision coding of a GeoSOT-3D geospatial subdivision grid, the following subdivision mapping relationship exists between a GeoSOT-3D grid code and a geospatial grid region name, that is, a mapping relationship between eight sub-grids of a next layer of grid subdivision is established.

$MF_{i+1}^{d\_lb}$, $MF_{i+1}^{d\_rb}$, $MF_{i+1}^{d\_lt}$ and $MF_{i+1}^{d\_rt}$ in the following equations respectively mean region name code mapping relationships of a grid with ascending longitude and latitude dimensions at a low altitude dimension.

$$MF_{i+1}^{d\_lb} = f(\text{GeoSOT}_{3D}\_Code_{i+1}^{d\_lb}, RegionName_{i+1}^{d\_lb})$$

$$MF_{i+1}^{d\_rb} = f(\text{GeoSOT}_{3D}\_Code_{i+1}^{d\_rb}, RegionName_{i+1}^{d\_rb})$$

$$MF_{i+1}^{d\_lt} = f(\text{GeoSOT}_{3D}\_Code_{i+1}^{d\_lt}, RegionName_{i+1}^{d\_lt})$$

$$MF_{i+1}^{d\_rt} = f(\text{GeoSOT}_{3D}\_Code_{i+1}^{d\_rt}, RegionName_{i+1}^{d\_rt})$$

$MF_{i+1}^{u\_lb}$, $MF_{i+1}^{u\_rb}$, $MF_{i+1}^{u\_lt}$ and $MF_{i+1}^{u\_rt}$ in the following equations respectively mean region name code mapping relationships of a grid with ascending longitude and latitude dimensions at a high altitude dimension.

$$MF_{i+1}^{u\_lb} = f(\text{GeoSOT}_{3D}\_Code_{i+1}^{u\_lb}, RegionName_{i+1}^{u\_lb})$$

$$MF_{i+1}^{u\_rb} = f(\text{GeoSOT}_{3D}\_Code_{i+1}^{u\_rb}, RegionName_{i+1}^{u\_rb})$$

$$MF_{i+1}^{u\_lt} = f(\text{GeoSOT}_{3D}\_Code_{i+1}^{u\_lt}, RegionName_{i+1}^{u\_lt})$$

$$MF_{i+1}^{u\_rt} = f(\text{GeoSOT}_{3D}\_Code_{i+1}^{u\_rt}, RegionName_{i+1}^{u\_rt})$$

Specifically, at a certain GeoSOT-3D grid subdivision layer, a mapping relationship between a three-dimensional grid code and a geospatial grid region name is expressed as follows:

$$(\text{GeoSOT}_{3D}\_Code, RegionName)_n \rightarrow \left( \bigcup_{i=0}^{n} \text{GeoSOT}_{3D}\_Code(x)_i \text{GeoSOT}_{3D}\_Code(y)_i \text{GeoSOT}_{3D}\_Code(z)_i, RegionName_n \right)$$

$$0 \leq n \leq 32$$

where x is the longitude coordinate value, y is the latitude coordinate value, z is the altitude coordinate value, n is the subdivision layer, and RegionName is a region name identification of a spatial region corresponding to the code under the subdivision layer n.

2.3 Geospatial Grid Region Naming Authorization Sub-Protocol

The geospatial grid region naming authorization sub-protocol is configured to verify local uniqueness of a personal geospatial grid region name in its corresponding area region namespace, and the algorithm steps for naming authorization stipulated by the protocol are shown in Table 2.

TABLE 2

Algorithm Steps of the Geospatial Grid Region Naming Authorization Sub-protocol

| Step No. | Algorithm Step |
|---|---|
| Step 1 | The user enters a personal region name $P\_RegionName_u$ to be registered and a corresponding personal region namespace $SP\_RegionName_u$. |
| Step 2 | Find the area region namespace $SA\_DomainName$ it belongs to in accordance with the personal region namespace $SP\_RegionName_u$. |
| Step 3 | Retrieve a set $PRNSet_u = \{P\_RegionName_u^0, P\_RegionName_u^1, P\_RegionName_u^2, \ldots, P\_RegionName_u^n\}$ of personal region names that have been registered in the area region namespace $SA\_RegionName_u$. |
| Step 4 | If $P\_RegionName_u \in PRNSet_u$, the naming authorization of the personal region name fails; otherwise, the naming authorization succeeds. |

3. Association Layer Protocol

The association layer protocol, as a core protocol layer in the geospatial grid region name interoperability protocol system, is configured for interoperability of the ubiquitous location information, that is, providing interactive data access services. This protocol layer stipulates code conversion algorithms for various industries and interoperability methods based on geospatial grid region names.

3.1 Geospatial Grid Region Name-Based Code Conversion Sub-Protocol

The geospatial grid region name-based code conversion sub-protocol configures a geospatial grid region name as middleware to achieve mutual conversion of grid codes in different industries.

A set of organization codes corresponding to existing different industry organizations is as follows:

$$OriCodeSet = \{OriCode_1, OriCode_2, OriCode_3, \ldots, OriCode_m\}$$

A set of personal code types corresponding to the set of organization codes is as follows:

$$OriCodeSet = \{P\_CodeType_1, P\_CodeType_2, P\_CodeType_3, \ldots, P\_CodeType_m\}$$

Within a personal space $SP\_RegionName_i$ corresponding to a certain personal region name $P\_RegionName_i$, there is a set of personal code s $P\_CodeSet_i=\{P\_Code_1^i, P\_Code_2^i, P\_Code_3^i, \ldots, P\_Code_m^i\}$ corresponding to different industry organizations, and based on a spatial mapping relationship between the personal region name $P\_RegionName_i$ and $P\_CodeSet_i$, a conversion from an initial or input personal code such as $P\_Code_1^i$ to a target or output personal code such as $P\_Code_m^i$ is achieved.

Therefore, a region name-based code conversion can be expressed as the following progressive relationship:

$$P\_Code_1^i \rightarrow SP\_RegionName_i$$

$$SP\_RegionName_i \rightarrow P\_RegionName_i$$

$$P\_RegionName_i \rightarrow P\_CodeSet_i$$

$$P\_CodeSet_i \rightarrow P\_Code_m^i$$

3.2 Geospatial Grid Region Name Interoperability Sub-Protocol

The geospatial grid region name interoperability sub-protocol supports interoperability between the different industry organizations or different departments of an identical industry organization within a grid corresponding to an identical geospatial grid region name, and is allowed for achieving exchange of heterogeneous data within the grid. A mapping relationship between a geospatial grid region name, a grid code, and an organization code is as follows, where OriCode means an organization department code.

$$R_{o,a,p \rightarrow c} \rightarrow <GridCode_1, OriCode>$$

$$R_{o,a,p \rightarrow c} \rightarrow <GridCode_2, OriCode>$$

$$R_{o,a,p \rightarrow c} <GridCode_3, OriCode>$$

$$R_{o,a,p \rightarrow c} \rightarrow <GridCode_n, OriCode>$$

Spatial interoperability between different organizations or different departments of an identical organization based on the geospatial grid region name GGRN is a spatial association operation, and the geospatial grid region name GGRN is a parameter of the spatial association operation.

Assuming that there are logistics companies A (LogisticsCompanyA) and B (LogisticsCompanyB) in the express industry, their respective information can be spatially associated through GGRN. The expression to implement the spatial association operation is as follows:

select * from LogisticsCompanyA LCA join LogisticsCompanyB LCB on LCA·GGRN=LCB·GGRN 4. Application Layer Protocol The application layer protocol is configured mainly for a user and provides the user with registration services and resolution services for the geospatial grid region names. It includes a geospatial grid region name registration sub-protocol and a geospatial grid region name resolution sub-protocol.

4.1 Geospatial Grid Region Name Registration Sub-Protocol

The geospatial grid region name registration sub-protocol enables the user to customize a geospatial grid region name and register the geospatial grid region name in G2RS-GGRN through a local geospatial grid region name registration and resolution service L2RS-GGRN, and open protocols and hierarchical namespaces are distributed for a specific geospatial grid region name registration process. The ubiquitous location information with a geospatial grid region name can improve the value of spatial data. The specific geospatial grid region name registration process is shown in FIG. 1, and steps of the process and corresponding metadata transmitted are shown in Table 3.

Specifically, from the server level, (1) the user enters an organization region name to which this registration belongs through a geospatial region name system platform, selects a personal region namespace, and enters ubiquitous location information; and then the geospatial region name system platform automatically calculates an area region name from the personal region namespace based on a spatial location, and sends a geospatial grid region name registration request to a geospatial root region name server RootServ;

(2) the geospatial root region name server RootServ determines whether the user has registration permission and, if the user has the registration permission, transmits a registration authorization instruction to a code server CodeServ;

(3) the code server CodeServ transmits a generated personal code to a data server DataServ corresponding to an area region name at a 5th layer where the code server is located;

(4) the data server DataServ determines local uniqueness of a personal region name within the area region name at the 5th layer, and transmits a registration request with the local uniqueness to an area region name server AreaServ;

(5) a root server Root_AreaServ in the area region name server AreaServ finds a corresponding area sub-region name server $Sub\_AreaServ_j \in \{j|\alpha, \beta, \gamma, \delta, \ldots\}$ through an area region name at a 2nd layer, and area region names from the 3rd layer to the 5th layer as well as personal region names and personal codes in an area region namespace at the 5th layer are registered in the area sub-region name server $Sub\_AreaServ_j$;

(6) a root server Root_OrgServ in the organization region name OrgServ finds a corresponding organization sub-region name server $Sub\_OrgServ_i \in \{i|A, B, C, \ldots\}$ through an organization region name; an area region name is registered in the organization sub-region name server $Sub\_OrgServ_i$; and a registration application within the organization region name, namely an authorization instruction, is submitted to the geospatial root region name server RootServ;

(7) the geospatial root region name server RootServ authorizes the data server DataServ to store the personal region name and corresponding ubiquitous location information of the personal region name in the large table of geospatial grid region name indexes; and (8) the organization region name server OrgServ sends to the user a geospatial grid region name registration result: 0 (failure) or 1 (success).

TABLE 3

Steps of the Geospatial Grid Region Name Registration Process and Corresponding

| Step of the Registration Process | Metadata Transmitted during the Step |
|---|---|
| (1) | Ubiquitous location information, personal region name, area region name, and organization region name |
| (2) | Ubiquitous location information, personal region name, area region name, organization region name, and authorization instruction |
| (3) | Ubiquitous location information, personal region name, area region name, organization region name, authorization instruction, and personal code |
| (4) | Ubiquitous location information, personal region name, area region name, organization region name, authorization instruction, personal code, and local uniqueness determination code |
| (5) | Ubiquitous location information, personal region name, area region name, organization region name, authorization instruction, and personal code |
| (6) | Ubiquitous location information, personal region name, area region name, organization region name, authorization instruction, and personal code |
| (7) | Ubiquitous location information, personal region name, area region name, organization region name, authorization instruction, and personal code |
| (8) | Personal region name, area region name, organization region name, and geospatial grid region name registration result |

4.2 Geospatial Grid Region Name Resolution Sub-Protocol

The geospatial grid region name resolution sub-protocol includes two types of resolution: vertical resolution of an organization region name and vertical resolution of an area region name, and a resolution process resolves a personal region name to the corresponding ubiquitous location information of the personal region name.

I. Vertical Resolution of an Organization Region Name

Figure 2:
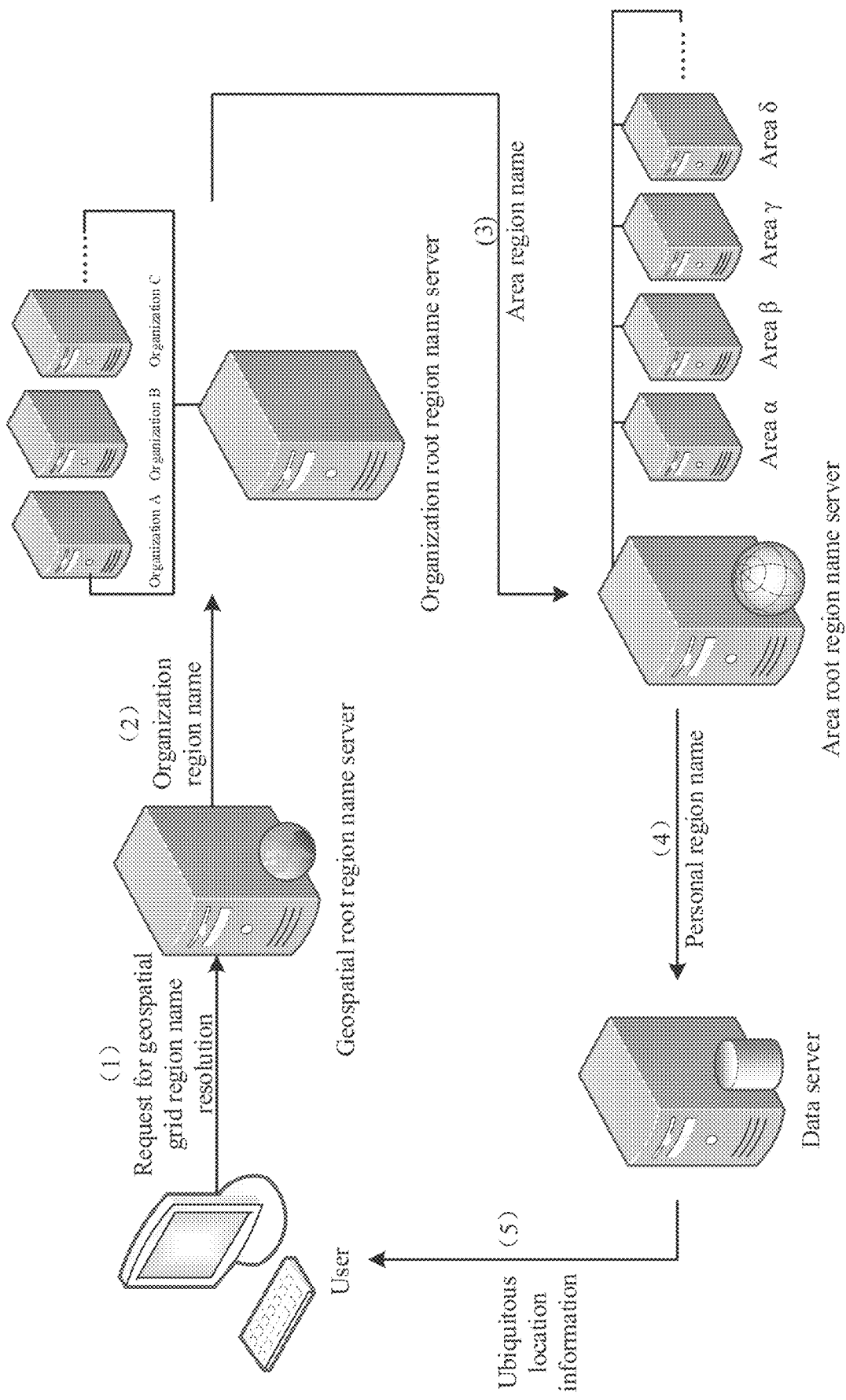
FIG. 2 is a schematic diagram of vertical resolution of an organization region name in accordance with the present invention.

Vertical recursive resolution of an organization region name is a process that first classifies the organization region name and performs resolution within an organization region namespace. The specific resolution process is shown in FIG. 2, and steps of the process and corresponding metadata transmitted are shown in Table 4.

Specifically, from the server level, (1) the user sends a request for geospatial grid region name resolution of <personal segment.area segment.organization segment.root segment> to the geospatial root region name server RootServ through the geospatial region name system platform;

(2) the geospatial root region name server RootServ resolves an organization region name and an area region name, and finds the organization region name server OrgServ through the resolved organization region name;

(3) the root server Root_OrgServ in the organization region name server OrgServ finds a corresponding organization sub-region name server Sub_OrgServ$_i \in \{i|A, B, C, \ldots\}$ through the organization region name; and the organization sub-region name server Sub_OrgServ$_i$ transmits the request to the area region name server corresponding to the organization region name AreaServ;

(4) the root server Root_AreaServ in the area region name server AreaServ, based on an area region name at the 2nd layer, finds a corresponding area sub-region name server Sub_AreaServ$_j \in \{j|\alpha, \beta, \gamma, \delta, \ldots\}$ through area region name resolution; and the area sub-region name server Sub_AreaServ$_j$, based on an area region name at the 5th layer, transmits the request down to the data server DataServ corresponding to the area region name and the organization region name;

(5) after obtaining authorization, the data server DataServ reads ubiquitous location information in the large table of geospatial grid region name indexes stored by the data server based on the personal region name, and transmits the read ubiquitous location information to the user through the geospatial region name system platform.

TABLE 4

Steps of Vertical Resolution Process of an Organization Region Name and Corresponding Metadata Transmitted

| Step of the Resolution Process | Metadata Transmitted during the Step |
|---|---|
| (1) | Request for geospatial grid region name resolution |
| (2) | Request for geospatial grid region name resolution, organization region name, area region name, and personal region name |
| (3) | Request for geospatial grid region name resolution, area region name, and personal region name |
| (4) | Request for geospatial grid region name resolution, and personal region name |
| (5) | Ubiquitous location information |

II. Vertical Resolution of an Area Region Name

Figure 3:
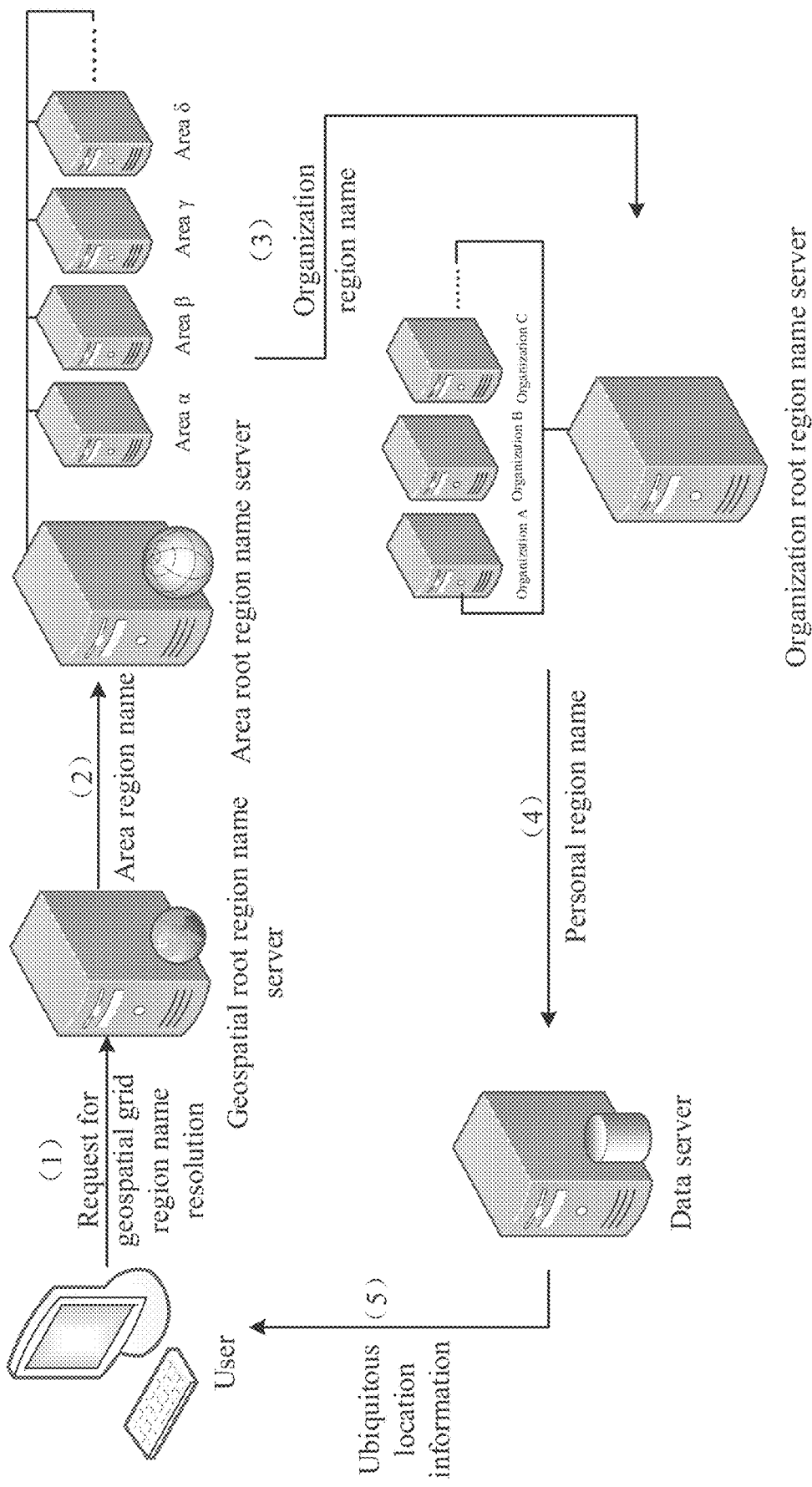
FIG. 3 is a schematic diagram of vertical resolution of an area region name in accordance with the present invention.

Vertical recursive resolution of an area region name is a process that first classifies the area region name and performs resolution within the area region namespace. The specific resolution process is shown in FIG. 3, and steps of the process and corresponding metadata transmitted are shown in Table 5.

Specifically, from the server level,
(1) the user sends a request for geospatial grid region name resolution of <personal segment.area segment..organization segment.root segment> to the geospatial root region name server RootServ through the geospatial region name system platform;
(2) the geospatial root region name server RootServ resolves an area region name and an organization region name, and finds the area region name server AreaServ through the resolved area region name;
(3) the root server Root_AreaServ in the area region name server AreaServ, based on an area region name at the 2nd layer, finds a corresponding area sub-region name server Sub_AreaServ$_j\in\{j|\alpha, \beta, \gamma, \delta, \ldots\}$ through area region name resolution; and the area sub-region name server Sub_AreaServ$_j$ transmits the request to the organization region name server OrgServ corresponding to the area region name;
(4) the root server Root_OrgServ in the organization region name server OrgServ finds a corresponding organization sub-region name server Sub_OrgServ$_j\in\{i|A, B, C, \ldots\}$ through the organization region name; and the organization sub-region name server Sub_OrgServ$_i$, based on an area region name at the 5th layer, transmits the request down to the data server DataServ corresponding to the area region name and the organization region name;
(5) after obtaining authorization, the data server DataServ reads ubiquitous location information in the large table of geospatial grid region name indexes stored by the data server based on the personal region name, and transmits the read ubiquitous location information to the user through the geospatial region name system platform.

TABLE 5

Steps of Vertical Resolution Process of an Area Region Name and Corresponding Metadata Transmitted

| Step of the Resolution Process | Metadata Transmitted during the Step |
| --- | --- |
| (1) | Request for geospatial grid region name resolution |
| (2) | Request for geospatial grid region name resolution, area region name, organization region name, and personal region name |
| (3) | Request for geospatial grid region name resolution, organization region name, and personal region name |
| (4) | Request for geospatial grid region name resolution, and personal region name |
| (5) | Ubiquitous location information |

The present invention constructs the corresponding protocol system from the subdivision layer, the management layer, the association layer, and the application layer, thereby achieving registration and resolution of a geospatial grid region name and mutual association and spatial interoperability of ubiquitous location information based on the geospatial grid region name. The registration and resolution of a geospatial grid region name is a public service, in which the region name registration service is mainly for individual users who apply to register a geospatial grid region name, while the resolution service is mainly for individual users and organizations, for example, when a courier services company sends a geospatial grid region name, the corresponding address, three-segment code/four-segment code, and other information will be returned.

The above-described embodiments are exemplary embodiments of the present invention, and any changes made in accordance with the technical solutions of the present invention and the resulting functional effects without departing from the scope of the technical solutions of the present invention shall fall within the protection scope of the present invention.

What is claimed is:

1. A method for constructing a geospatial grid region name interoperability protocol system, wherein the geospatial grid region name interoperability protocol system is constructed from four layers: a subdivision layer, a management layer, an association layer, and an application layer, comprising a subdivision layer protocol, an association layer protocol, a management layer protocol, and an application layer protocol;

the subdivision layer protocol, as a lowest-layer protocol in the geospatial grid region name interoperability protocol system, is configured for grid subdivision expression and grid coding of ubiquitous location information under a GeoSOT geospatial subdivision grid reference framework and a GeoSOT-3D three-dimensional geospatial subdivision grid reference framework;

the management layer protocol is configured for organization of a large table of geospatial grid region name indexes, a mapping relationship between geospatial grid region names, and naming authorization of the geospatial grid region names;

the association layer protocol, as a core protocol layer in the geospatial grid region name interoperability protocol system, is configured for interoperability of the ubiquitous location information, that is, providing interactive data access services;

the application layer protocol is configured for a user and provides the user with registration services and resolution services for the geospatial grid region names; and the subdivision layer protocol comprises a grid subdivision sub-protocol and a grid coding sub-protocol, wherein the grid subdivision sub-protocol is a grid subdivision expression of a geospatial location, and the grid coding sub-protocol is as follows:

GeoSOT binary one-dimensional coding is configured for coding an area region name, GeoSOT-3D binary one-dimensional coding is configured for coding a personal region name, the GeoSOT-3D binary one-dimensional coding is a coding method that separately codes longitude, latitude, and altitude dimensions, and the GeoSOT binary one-dimensional coding does not require coding of the altitude dimension and codes the longitude and latitude dimensions in an identical manner as the GeoSOT-3D binary one-dimensional coding;

binary one-dimensional coding of the longitude and latitude dimensions is more efficient in calculating an inclusion relationship between codes; assuming that there is a ubiquitous location information positioning point P(x, y, z) in a geospace, wherein x, y, and z are longitude, latitude, and altitude coordinate values respectively of the ubiquitous location information positioning point P, conditions $x \in [-180°, 180°]$, $y \in [-90°, 90°]$, and $z \in [0, 50000000m]$ are met, and the ubiquitous location information positioning point P is subject to GeoSOT-3D binary three-dimensional coding at an n-th three-dimensional grid subdivision layer, and specific coding assignment formulas for GeoSOT-3D binary longitude, latitude, and altitude dimensions of the ubiquitous location information positioning point P are respectively as follows:

$$\text{GeoSOT}_{3D}\_\text{Code}(x)_n = \begin{cases} \left\lfloor \frac{x+256}{2^{9-n}} \right\rfloor_{(2)}, & 0 \leq n \leq 9 \\ \text{GeoSOT}_{3D}\_\text{Code}(x)_9 \times \frac{64}{2^{15-n}} + \left\lfloor (x+256-\text{GeoSOT}_{3D}\_\text{Code}(x)_9) \times \frac{60}{2^{15-n}} \right\rfloor_{(2)}, & 10 \leq n \leq 15 \\ \text{GeoSOT}_{3D}\_\text{Code}(x)_{15} \times \frac{64}{2^{21-n}} + \left\lfloor (x+256-\text{GeoSOT}_{3D}\_\text{Code}(x)_{15}) \times \frac{60}{2^{21-n}} \right\rfloor_{(2)}, & 16 \leq n \leq 32 \end{cases}$$

the above formula is a coding formula for the GeoSOT-3D binary longitude dimension, wherein $\text{GeoSOT}_{3D}\_\text{Code}(x)_n$ means a three-dimensional grid longitude dimension code value corresponding to x at the n-th three-dimensional grid subdivision layer;

$$\text{GeoSOT}_{3D}\_\text{Code}(y)_n = \begin{cases} \left\lfloor \frac{y+256}{2^{9-n}} \right\rfloor_{(2)}, & 0 \leq n \leq 9 \\ \text{GeoSOT}_{3D}\_\text{Code}(y)_9 \times \frac{64}{2^{15-n}} + \left\lfloor (y+256-\text{GeoSOT}_{3D}\_\text{Code}(y)_9) \times \frac{60}{2^{15-n}} \right\rfloor_{(2)}, & 10 \leq n \leq 15 \\ \text{GeoSOT}_{3D}\_\text{Code}(y)_{15} \times \frac{64}{2^{21-n}} + \left\lfloor (y+256-\text{GeoSOT}_{3D}\_\text{Code}(y)_{15}) \times \frac{60}{2^{21-n}} \right\rfloor_{(2)}, & 16 \leq n \leq 32 \end{cases}$$

the above formula is a coding formula for the GeoSOT-3D binary latitude dimension, wherein $\text{GeoSOT}_{3D}\_\text{Code}(y)_n$ means a three-dimensional grid latitude dimension code value corresponding to y at the n-th three-dimensional grid subdivision layer;

$$\text{GeoSOT}_{3D}\_\text{Code}(z)_n = z \times \left\lfloor \frac{2^n}{512 \times 111300} \right\rfloor_{(2)}, 0 \leq n \leq 32$$

the above formula is a coding formula for the GeoSOT-3D binary altitude dimension, wherein $\text{GeoSOT}_{3D}\_\text{Code}(z)_n$ means a three-dimensional grid altitude dimension code value corresponding to z at the n-th three-dimensional grid subdivision layer;

wherein a GeoSOT-3D binary three-dimensional code $\text{GeoSOT}_{3D}\_\text{Code}(x, y, z)_n$ of the ubiquitous location information positioning point P(x, y, z) in the geospace is expressed as follows $(\text{GeoSOT}_{3D}\_\text{Code}(x)_n, \text{GeoSOT}_{3D}\_\text{Code}(y)_n, \text{GeoSOT}_{3D}\_\text{Code}(z)_n)$, and a corresponding GeoSOT-3D binary one-dimensional code is expressed as follows:

$U_{i=0}^n \text{GeoSOT}_{3D}\_\text{Code}(x)_i \text{GeoSOT}_{3D}\_\text{Code}(y)_i \text{GeoSOT}_{3D}\_\text{Code}(z)_i, 0 \leq n \leq 32.$ 2. The method for constructing the geospatial grid region name interoperability protocol system according to claim 1, wherein the management layer protocol comprises a geospatial grid region name organization sub-protocol, a geospatial grid region name mapping sub-protocol, and a geospatial grid region naming authorization sub-protocol, wherein the geospatial grid region name organization sub-protocol is a normalized protocol for ubiquitous location information organization for management of the large table of geospatial grid region name indexes;

a key in a database storing the geospatial grid region name indexes is a geospatial grid region name, and a value is ubiquitous location information metadata within a spatial location range represented by the geospatial grid region name, and parent and child storage paths thereof;

Num_of_Column( ) is defined as a function to obtain a number of columns in a specified value, and $n_1$=Num_of_Column(Value_1) and $n_2$=Num_of_Column(Value_2);

the geospatial grid region name mapping sub-protocol is as follows:

in accordance with the GeoSOT-3D binary three-dimensional code, a mapping relationship function between a GeoSOT-3D binary one-dimensional grid code and a region name identification expression is as follows:

$$MF_i = f(GeoSOT_{3D}\_Code_i, RegionName_i), 0 \leq i \leq 32$$

wherein $GeoSOT_{3D}\_Code_i$ is a GeoSOT-3D binary one-dimensional grid code at an i-th layer, $RegionName_i$ is a region name identification expression of the i-th layer, and the function f is the mapping relationship function between the GeoSOT-3D binary one-dimensional grid code and the region name identification expression;

in accordance with Z-order octree subdivision coding of a GeoSOT-3D three-dimensional geospatial subdivision grid, the following mapping relationship exists between a GeoSOT-3D grid code and a geospatial grid region name, that is, a mapping relationship between eight sub-grids of a next layer of grid subdivision is established;

$$MF_{i+1}^{d\_lb} = f(GeoSOT_{3D}\_Code_{i+1}^{d\_lb}, RegionName_{i+1}^{d\_lb})$$

$$MF_{i+1}^{d\_rb} = f(GeoSOT_{3D}\_Code_{i+1}^{d\_rb}, RegionName_{i+1}^{d\_rb})$$

$$MF_{i+1}^{d\_lt} = f(GeoSOT_{3D}\_Code_{i+1}^{d\_lt}, RegionName_{i+1}^{d\_lt})$$

$$MF_{i+1}^{d\_rt} = f(GeoSOT_{3D}\_Code_{i+1}^{d\_rt}, RegionName_{i+1}^{d\_rt})$$

wherein $MF_{i+1}^{d\_lb}$, $MF_{i+1}^{d\_rb}$, $MF_{i+1}^{d\_lt}$, and $MF_{i+1}^{d\_rt}$ respectively mean region name code mapping relationships of a grid with ascending longitude and latitude dimensions at a low altitude dimension;

$$MF_{i+1}^{u\_lb} = f(GeoSOT_{3D}\_Code_{i+1}^{u\_lb}, RegionName_{i+1}^{u\_lb})$$

$$MF_{i+1}^{u\_rb} = f(GeoSOT_{3D}\_Code_{i+1}^{u\_rb}, RegionName_{i+1}^{u\_rb})$$

$$MF_{i+1}^{u\_lt} = f(GeoSOT_{3D}\_Code_{i+1}^{u\_lt}, RegionName_{i+1}^{u\_lt})$$

$$MF_{i+1}^{u\_rt} = f(GeoSOT_{3D}\_Code_{i+1}^{u\_rt}, RegionName_{i+1}^{u\_rt})$$

where $MF_{i+1}^{u\_lb}$, $MF_{i+1}^{u\_rb}$, $MF_{i+1}^{u\_lt}$, and $MF_{i+1}^{u\_rt}$ respectively mean region name code mapping relationships of a grid with ascending longitude and latitude dimensions at a high altitude dimension;

at a certain GeoSOT-3D grid subdivision layer, a mapping relationship between a three-dimensional grid code and a geospatial grid region name is expressed as follows:

$$\left( \bigcup_{i=0}^{n} GeoSOT_{3D}\_Code(x)_i GeoSOT_{3D}\_Code(y)_i GeoSOT_{3D}\_Code(z)_i, RegionName_n \right),$$

$$0 \leq n \leq 32$$

wherein x is the longitude coordinate value, y is the latitude coordinate value, z is the altitude coordinate value, n is the subdivision layer, and RegionName is a region name identification of a spatial region corresponding to the code under the subdivision layer n.

3. The method for constructing the geospatial grid region name interoperability protocol system according to claim 1, wherein the association layer protocol comprises a geospatial grid region name-based code conversion sub-protocol and a geospatial grid region name interoperability sub-protocol, wherein the geospatial grid region name-based code conversion sub-protocol configures a geospatial grid region name as middleware to achieve mutual conversion of grid codes in different industries; and a set of organization codes corresponding to different industry organizations is as follows:

$$OriCodeSet = \{OriCode_1, OriCode_2, OriCode_3, \ldots, OriCode_m\}$$

wherein $OriCode_m$ means an organization code corresponding to an m-th industry organization;

a set of personal code types corresponding to the set of organization codes is as follows:

$$OriCodeSet = \{P\_CodeType_1, P\_CodeType_2, P\_CodeType_3, \ldots, P\_CodeType_m\}$$

$P\_CodeType_m$ means a personal code type corresponding to an m-th organization code; within a personal space $SP\_RegionName_i$ corresponding to a certain personal region name $P\_RegionName_i$, there is a set of personal codes $P\_CodeSet_i = \{P\_Code_1^i, P\_Code_2^i, P\_Code_3^i, \ldots, P\_Code_m^i\}$ corresponding to the different industry organizations, wherein $P\_Code_m^i$ means a personal code corresponding to the m-th industry organization, and based on a spatial mapping relationship between the personal region name $P\_RegionName_i$ and $P\_CodeSet_i$, a conversion from an initial or input personal code to a target or output personal code is achieved;

wherein a region name-based code conversion is expressed as the following progressive relationship:

$$P\_Code_1^i \rightarrow SP\_RegionName_i$$

$$SP\_RegionName_i \rightarrow P\_RegionName_i$$

$$P\_RegionName_i \rightarrow P\_CodeSet_i$$

$$P\_CodeSet_i \rightarrow P\_Code_m$$

the geospatial grid region name interoperability sub-protocol supports interoperability between the different industry organizations or different departments of an identical industry organization within a grid corresponding to an identical geospatial grid region name, and is allowed for achieving exchange of heterogeneous data within the grid; and a mapping relationship between a geospatial grid region name, a grid code, and an organization code is as follows, wherein OriCode means an organization code corresponding to an industry organization;

$$R_{o,a,p \rightarrow c} \rightarrow <GridCode_1, OriCode>$$

$$R_{o,a,p \rightarrow c} \rightarrow <GridCode_2, OriCode>$$

$$R_{o,a,p \rightarrow c} \rightarrow <GridCode_3, OriCode>$$

$$R_{o,a,p \rightarrow c} \rightarrow <GridCode_n, OriCode>$$

o, a, p correspond to an organization segment, an area segment, and a personal segment, respectively; c is a characterized geospatial range; n is a number of grids at the N-th subdivision layer; $R_{o,a,p \rightarrow c}$ is a geospatial grid region name; and $GridCode_n$ is a grid code;

spatial interoperability between different organizations or different departments of an identical organization based on the geospatial grid region name GGRN is a spatial association operation, and the geospatial grid region name GGRN is a parameter of the spatial association operation.

4. The method for constructing the geospatial grid region name interoperability protocol system according to claim 1, wherein the application layer protocol comprises a geospatial grid region name registration sub-protocol and a geospatial grid region name resolution sub-protocol, wherein the geospatial grid region name registration sub-protocol enables the user to customize a geospatial grid region name and register the geospatial grid region name in a global geospatial grid region name registration and resolution service G2RS-GGRN through a local geospatial grid region name registration and resolution service L2RS-GGRN, and a specific geospatial grid region name registration process is as follows:

1) the user enters an organization region name to which this registration belongs through a geospatial region name system platform, selects a personal region namespace, and enters ubiquitous location information; and the geospatial region name system platform automatically calculates an area region name from the personal region namespace based on a spatial location, and sends a geospatial grid region name registration request to a geospatial root region name server RootServ;

2) the geospatial root region name server RootServ determines whether the user has registration permission and, if the user has the registration permission, transmits a registration authorization instruction to a code server CodeServ;

3) the code server CodeServ transmits a generated personal code to a data server DataServ corresponding to an area region name at a 5th layer where the code server is located;

4) the data server DataServ determines local uniqueness of a personal region name within the area region name at the 5th layer, and transmits a registration request with the local uniqueness to an area region name server AreaServ;

5) a root server Root_AreaServ in the area region name server AreaServ finds a corresponding area sub-region name server Sub_AreaServ$_j \in \{j|\alpha, \beta, \gamma, \delta, \ldots\}$ through an area region name at a 2nd layer, wherein $\alpha$, $\beta$, $\gamma$, $\delta$, ... are area sub-region name servers, area region names from a 3rd layer to the 5th layer as well as personal region names and personal codes in an area region namespace at the 5th layer are registered in the area sub-region name server Sub_AreaServ$_j$;

6) a root server Root_OrgServ in an organization region name server OrgServ finds a corresponding organization sub-region name server Sub_OrgServ$_i \in \{i|A, B, C, \ldots\}$ through an organization region name, wherein A, B, C, ... are sub-region name servers for each region; an area region name is registered in the organization sub-region name server Sub_OrgServ$_i$; and a registration application within the organization region name, namely an authorization instruction, is submitted to the geospatial root region name server RootServ;

7) The geospatial root region name server RootServ authorizes the data server DataServ to store the personal region name and corresponding ubiquitous location information of the personal region name in the large table of geospatial grid region name indexes; and 8) The organization region name server OrgServ sends to the user a geospatial grid region name registration result: 0 (failure) or 1 (success);

the geospatial grid region name resolution sub-protocol comprises two types of resolution: vertical resolution of an organization region name and vertical resolution of an area region name, and a resolution process resolves a personal region name to the corresponding ubiquitous location information of the personal region name as follows:

I. Vertical Resolution of an Organization Region Name vertical recursive resolution of an organization region name is a process that first classifies the organization region name and performs resolution within an organization region namespace as follows:

1) The user sends a request for geospatial grid region name resolution of <personal segment.area segment.organization segment.root segment> to the geospatial root region name server RootServ through the geospatial region name system platform;

2) The geospatial root region name server RootServ resolves an organization region name and an area region name, and finds the organization region name server OrgServ through the resolved organization region name;

3) The root server Root_OrgServ in the organization region name server OrgServ finds a corresponding organization sub-region name server Sub_OrgServ$_i \in \{i|A, B, C, \ldots\}$ through the organization region name; the organization sub-region name server Sub_OrgServ$_i$ transmits the request to the area region name server AreaServ corresponding to the organization region name;

4) The root server Root_AreaServ in the area region name server AreaServ, based on an area region name at the 2nd layer, finds a corresponding area sub-region name server Sub_AreaServ$_j \in \{j|\alpha, \beta, \gamma, \delta, \ldots\}$ through area region name resolution; and the area sub-region name server Sub_AreaServ$_j$, based on an area region name at the 5th layer, transmits the request down to the data server DataServ corresponding to the area region name and the organization region name;

5) After obtaining authorization, the data server DataServ reads ubiquitous location information in the large table of geospatial grid region name indexes stored by the data server based on the personal region name, and transmits the read ubiquitous location information to the user through the geospatial region name system platform;

II. Vertical Resolution of an Area Region Name vertical recursive resolution of an area region name is a process that first classifies the area region name and performs resolution within the area region namespace as follows:

1) The user sends a request for geospatial grid region name resolution of <personal segment.area segment.organization segment.root segment> to the geospatial root region name server RootServ through the geospatial region name system platform;

2) The geospatial root region name server RootServ resolves an area region name and an organization region name, and finds the area region name server AreaServ through the resolved area region name;

3) The root server Root_AreaServ in the area region name server AreaServ, based on an area region name at the 2nd layer, finds a corresponding area sub-region name server Sub_AreaServ$_j \in \{j|\alpha, \beta, \gamma, \delta, \ldots\}$ through area region name resolution; and the area sub-region name server $Sub\_AreaServ_j$ transmits the request to an organization region name OrgServ corresponding to the area region name;

4) The root server Root_OrgServ in the organization region name server OrgServ finds a corresponding organization sub-region name server $Sub\_OrgServ_i \in \{i|A, B, C, \ldots\}$ through the organization region name; and the organization sub-region name server $Sub\_OrgServ_i$, based on an area region name at the 5th layer, transmits the request down to the data server DataServ corresponding to the area region name and the organization region name; and 5) After obtaining authorization, the data server DataServ reads ubiquitous location information in the large table of geospatial grid region name indexes stored by the data server based on the personal region name, and transmits the read ubiquitous location information to the user through the geospatial region name system platform.

* * * * *

UNITED STATES PATENT AND TRADEMARK OFFICE
CERTIFICATE OF CORRECTION

| | | |
|---|---|---|
| PATENT NO. | : 12,231,391 B1 | Page 1 of 1 |
| APPLICATION NO. | : 18/788290 | |
| DATED | : February 18, 2025 | |
| INVENTOR(S) | : Daoye Zhu | |

It is certified that error appears in the above-identified patent and that said Letters Patent is hereby corrected as shown below:

On the Title Page

Insert:
--(30) Foreign Application Priority Data
Sep. 26, 2023 (CN) ...............202311245274.2--

Signed and Sealed this
Eighteenth Day of March, 2025

Coke Morgan Stewart
*Acting Director of the United States Patent and Trademark Office*